United States Patent [19]

Lew et al.

[11] Patent Number: 5,047,782
[45] Date of Patent: Sep. 10, 1991

[54] SYSTEM AND METHOD FOR SIMULATING TARGETS FOR A RADAR RECEIVER UTILIZING AN OPTICAL LINK

[75] Inventors: Stanley Y. Lew, Parsippany, N.J.; Donald J. Grone, Reisterstown, Md.

[73] Assignee: Westinghouse Electric Corp., Pittsburgh, Pa.

[21] Appl. No.: 532,835

[22] Filed: Jun. 4, 1990

[51] Int. Cl.[5] .............................................. G01S 7/40
[52] U.S. Cl. .................................... 342/169; 342/172
[58] Field of Search ............................... 342/169, 172

[56] References Cited

U.S. PATENT DOCUMENTS

| 3,906,500 | 9/1975 | Redman | 342/167 |
|---|---|---|---|
| 3,953,850 | 4/1976 | Redman | 342/167 |
| 4,860,016 | 8/1989 | Westphal et al. | 342/169 |
| 4,903,029 | 2/1990 | Newberg et al. | 342/172 |
| 4,944,679 | 7/1990 | Allen et al. | 434/2 |

Primary Examiner—John B. Sotomayor
Attorney, Agent, or Firm—John K. Williamson

[57] ABSTRACT

Both a system and a method for simulating targets for a radar system is disclosed herein which generally comprises a test target generator having an input slaved to the pulse transmit frequencies of the radar system for generating a target simulating signal, a horn antenna for emitting the target simulating signal back to the radar receiver, a laser-operated optical transmission link having a single mode fiber optic cable for transmitting the target simulating signal from the test target generator to the horn antenna via optical carrier, and an amplification and processing circuit system connected between the output of the optical transmission link and the input of the horn antenna for increasing the amplitude of the target simulating signal to a level that is detectable by the radar receiver, and for further processing the signal. The test target generator also generates control signals indicative of a desired amplitude of the resulting target simulating signal, and the system preferably includes a controller in the form of a microprocessor whose input receives the control signal generated by the target generator, and whose output is connected to the amplifier system of the amplification and processing circuit. A phase shift circuit may be included in the processing circuit for both compensating for phase distortions that result from the impedances inherent in the remote transmission of the target simulating signal, and for providing a further means for selectively modifying the signature characteristics of the target simulating signal.

24 Claims, 3 Drawing Sheets

SYSTEM AND METHOD FOR SIMULATING TARGETS FOR A RADAR RECEIVER UTILIZING AN OPTICAL LINK

BACKGROUND OF THE INVENTION

This invention relates to radar testing systems, and is specifically concerned with both a system and a method for broadcasting a target simulating signal from a remotely located horn antenna that utilizes a laser-powered optical link to reduce power losses between a test target generator located near the radar system being tested, and the horn antenna.

Devices for testing military radar systems are known in the prior art. Such systems operate by providing a target simulating signal to the receiver of the radar system whose shape, frequency and phase angle simulates a moving target characterized by a distinctive signature that indicates what the target might be (i.e., helicopter, airplane or ship). Such target simulating devices are very useful in testing and calibrating military radar systems, as they allow the system operator to experience the radar system's response to a variety of types of targets under a variety of different speeds and distances without the need for providing drone targets, which is both inconvenient and expensive.

One of the first target simulating devices that was developed in the prior art was the repeater-modulator test apparatus. This device included a receiver antenna for collecting a sample of the pulses emitted by the transmitter of the radar system, in combination with tuned oscillator circuits for generating a target simulating signal that was recognizable as such by the receiver of the radar system. Such repeater-modulators also included various frequency, phase shifting and amplifier circuits for imparting various frequency, phase and amplitude characteristics to the resulting signal which the radar receiver would in turn interpret as speed, distance and target signature characteristics.

While such repeater-modulators have proven to be an effective means for testing a military radar system, there are unfortunately a number of drawbacks associated with such devices. For example, because the oscillator circuits that generate the target simulating signal emitted by these devices have to be specifically tuned to the transmission frequencies of the radar system being tested, repeater-modulators are narrow-band, custom-made devices that cannot easily be adapted to test more than one particular radar system. The dedicated nature of these devices, in combination with the sophisticated precision electronics which they must necessarily employ, renders them quite expensive. Still another shortcoming resides in the fact that the radar system being testing must have a complete and operable radar transmitter capable of transmitting target seeking pulses for this type of device to be used. This is a significant drawback, as the transmitter of such radar systems is usually the last major component of the radar system to be built and rendered operable. Thus the system cannot be effectively tested at an intermediate stage of construction, when only the radar receiver is operable. The necessity of transmitting actual target seeking pulses from the radar transmitter also poses a safety hazard to the personnel conducting the test, as such pulses at short range constitutes a potentially dangerous radiation source. Finally, the need to transmit actual target seeking pulses during the testing phase of the system poses a security hazard, as these pulses can be intercepted by hostile countries having an interest in the precise frequencies and characteristics of the radar systems used by the armed forces of the United States.

To overcome the shortcomings of repeater-modulation radar testing devices, RF horn antenna testing systems were developed. These systems have generally comprised a test target generating circuit whose input is slaved to the signal generating oscillators of the radar system, and a horn antenna remotely positioned from the receiver of the radar system for emitting the signal generated by the test target generator. Unlike repeater-modulator radar testing devices, such RF horn antenna testing systems are relatively broad-band devices which are able to generate the frequency specific pulses characteristic of a particular radar system being tested by slaving, rather than by custom tuning. Hence horn antenna testing systems are easily adapted for use on a variety of different radar systems. Since these systems do not require the transmitter of the radar system being tested to operate, but only the receiver thereof, testing can be commenced before the transmitter of the radar system becomes operational. The testing can also be accomplished in a safer and more secure manner, since it is unnecessary for the radar transmitter to emit any radiation that is potentially hazardous to the testing personnel, and potentially monitorable by hostile nations. This system has the added advantage of being simpler and less expensive than the previously described repeater-modulator testing devices.

However, despite these advantages, RF horn antenna target simulating systems also have drawbacks, the most major of which is the necessity of booster amplifiers along the length of the coaxial cable running from the target signal generator to the horn antenna. These losses are a consequence of the high impedances that coaxial cables exert on high frequency RF, in combination with the inherent limitations associated with the minimum distance that the horn antenna can be placed with respect to the receiver of the radar system in order for valid and accurate testing to be carried out. In order for the target simulating signals emitted by any type of testing system to appear as "point source targets" to the receiver of the radar system, the horn antennas have to be placed past what is known as the "near field" or Rayleigh field of the radar system being tested. Otherwise, the signals which they emanate will not appear in focus, and may even appear up to three times their actual size due to the non-parallel wave front of the target simulating pulse at short distances from the targets. Hence, if the tests are to be conducted accurately, it is essential that the horn antenna be placed outside the near field, which may be computed as follows:

$$R = 2D^2/L$$

where
R is the minimum range
D = diameter or width of the radar receiver antenna
L = the free space transmit wavelength For X-band radars currently in production, the minimum range R can be an excess of 500 ft. Because the coaxial cable which connects the test target generating circuit with the horn antenna typically attenuates RF at approximately 0.25 to 0.75 decibels per foot, over 250 dB worth of amplification would have to be provided to compensate for these power losses. Typically, booster amplifiers must be provided at various junctions in the coaxial cable along its 500 foot or greater length to obviate the need for a very large amplifier in the vicinity of the horn antenna. Of course, the use of one or more of these amplifiers could be obviated by providing a more powerful test target generating circuit. However, because the slaving connection between the test target generating circuit and the transmitter of the radar system requires the generator to be relatively close to the radar receiver, and because a generating circuit which operates at a power lever of much greater than 20 watts will generate a high enough level of radiation to interfere with the receiver of the radar system being tested, the use of such a high-power test target generating to obviate the use of booster amplifiers would require a substantial amount of expensive RF shielding. To overcome the limitations associated with coaxial cable power losses, modified designs of the RF horn antenna testing system have been developed wherein a pipe-like waveguide is used in lieu of a coaxial cable, since such waveguides have much better transmission efficiencies. However, these systems suffer from the additional expense associated with laying over 500 feet of a rigid, pipe-like waveguide. Moreover, a great deal of flexibility in moving the target horn in the test field is lost, since it is virtually impossible to move the waveguide once it is laid.

Clearly, a radar testing system is needed that preserves all of the advantages associated with RF horn antenna systems, but which does not suffer the power loss limitations associated with coaxial cable which require the use of booster amplifiers, or the rigidity and lack of versatility associated with the laying of a pipe-like waveguide over very long distances.

SUMMARY OF THE INVENTION

Generally speaking, the invention is both a system and method for simulating targets for a radar receiver that generally comprises a test target generator for generating a target simulating signal, a horn antenna for emitting the target simulating signal back to the radar receiver, and an optical transmission link for transmitting the target simulating signal via laser generated light from the test target generator to the horn antenna. Preferably the optical transmission link includes a multimode fiber optic cable for transmitting the laser-generated carrier from an RF-to-light transducer to a light-to-RF transducer. The use of such a fiber optic cable not only minimizes transmission power losses, but further affords a safer and more secure means of transmitting the target simulating signal than either a coaxial cable or a pipe-like waveguide.

The system further includes an amplifier assembly for increasing the amplitude of the RF signal generated by the second transducer of the optical link so that the target simulating signal emitted from the horn antenna is detectable by the radar receiver of the radar system. To this end, the amplifier assembly may include a fixed gain amplifier in combination with an attenuator circuit which attenuates the amount of amplification that the amplifier applies to the target simulating signal so that the resulting signal emitted by the horn antenna does not saturate the radar receiver.

The test target generator may further generate control signals indicative of a desired amplitude of the target simulating signal emitted by the horn antenna, and the system may further comprise a control means in the form of a microprocessor having an input connected to the output of the second transducer of the optical link for receiving the control signals, and an output connected to the attenuator circuit of the amplifier system for adjusting the magnitude of the amplification to the target simulating signal. The test target generator may further generate control signals indicative of a desired phase characteristic of the target simulating signal emitted by the horn antenna, and the system may also include a phase shifting circuit connected between the output of the amplifier system and the input of the horn antenna for selectively changing the phase characteristics of the target simulating signal in accordance with the control signals. Like the amplifier system, the phase shifting circuit is also connected to the output of the microprocessor that forms the controller. Both a bandpass filter and a carrier stripper circuit may be connected between the output of the second transducer of the optical link and the input of the microprocessor for rendering the amplification and phase control signals into a form which is readable by the microprocessor of the controller.

As a result of the very high transmission efficiencies achievable with a laser powered optical link having a fiber optic cable, the power level of the test target generator can be maintained at a level of 20 watts or less. The relatively low power operation of the test target generator minimizes both the chances that spurious transmissions from the target generator will interfere with the radar receiving during testing, as well as the need for RF shielding between the generator and the radar receiver. The fact that the test target generator is designed to be slaved to a variety of radar transmitters, in combination with the flexibility and low cost of fiber optic cable relative to a pipe-like waveguide, renders the system of the and where $\alpha$ and $\beta$ are scalar weights invention relatively inexpensive, and highly versatile. Finally, the more secure transmission properties of fiber optic cable relative to coaxial cable renders the test operations conducted by the system of the invention less prone to electronic eavesdropping, and therefore more secure.

BRIEF DESCRIPTION OF THE SEVERAL FIGURES

DETAILED DESCRIPTION OF THE PREFERRED EMBODIMENT

Figure 1:
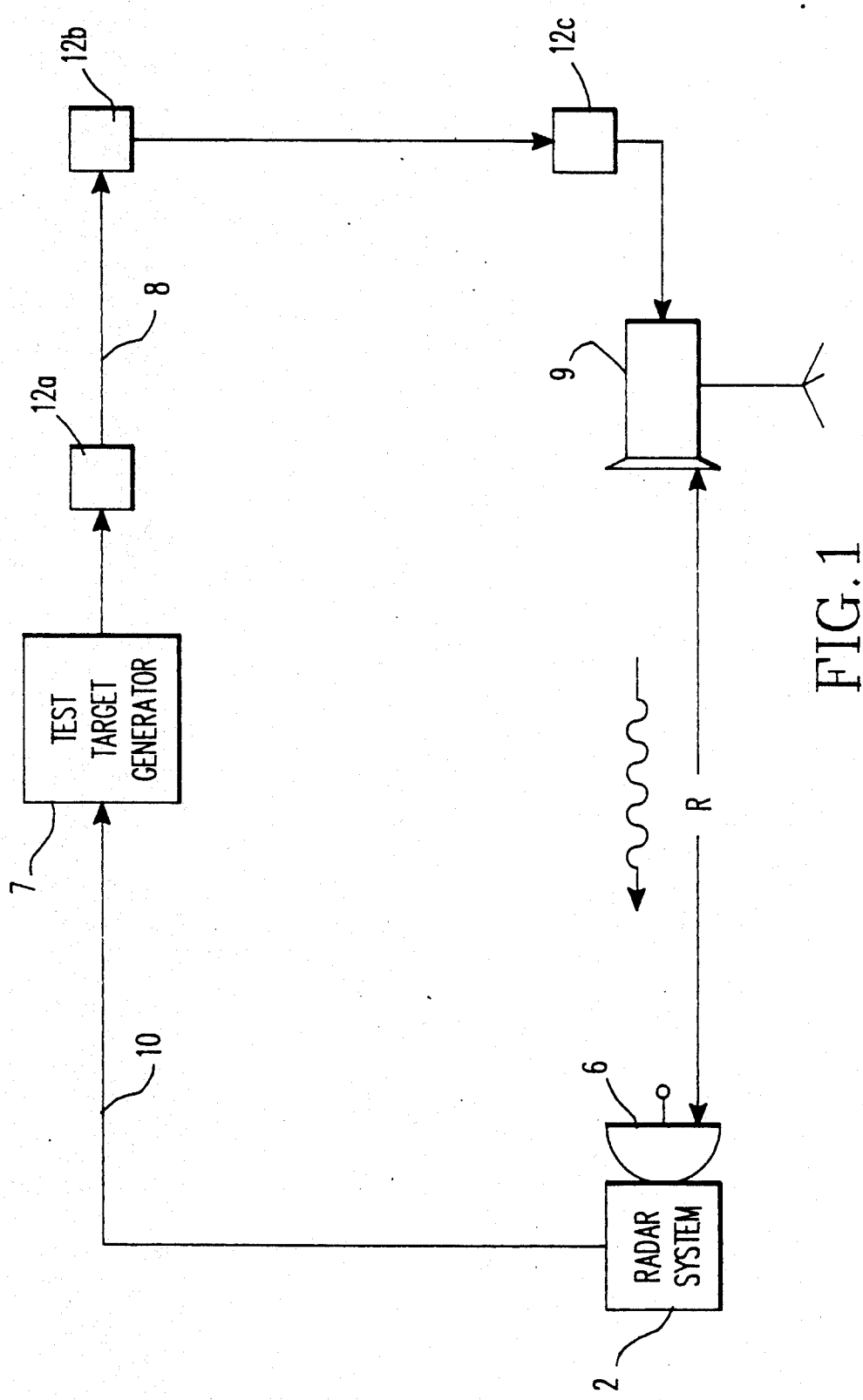
FIG. 1 is a schematic diagram of a prior art, RF horn antenna testing system.
Figure 2:
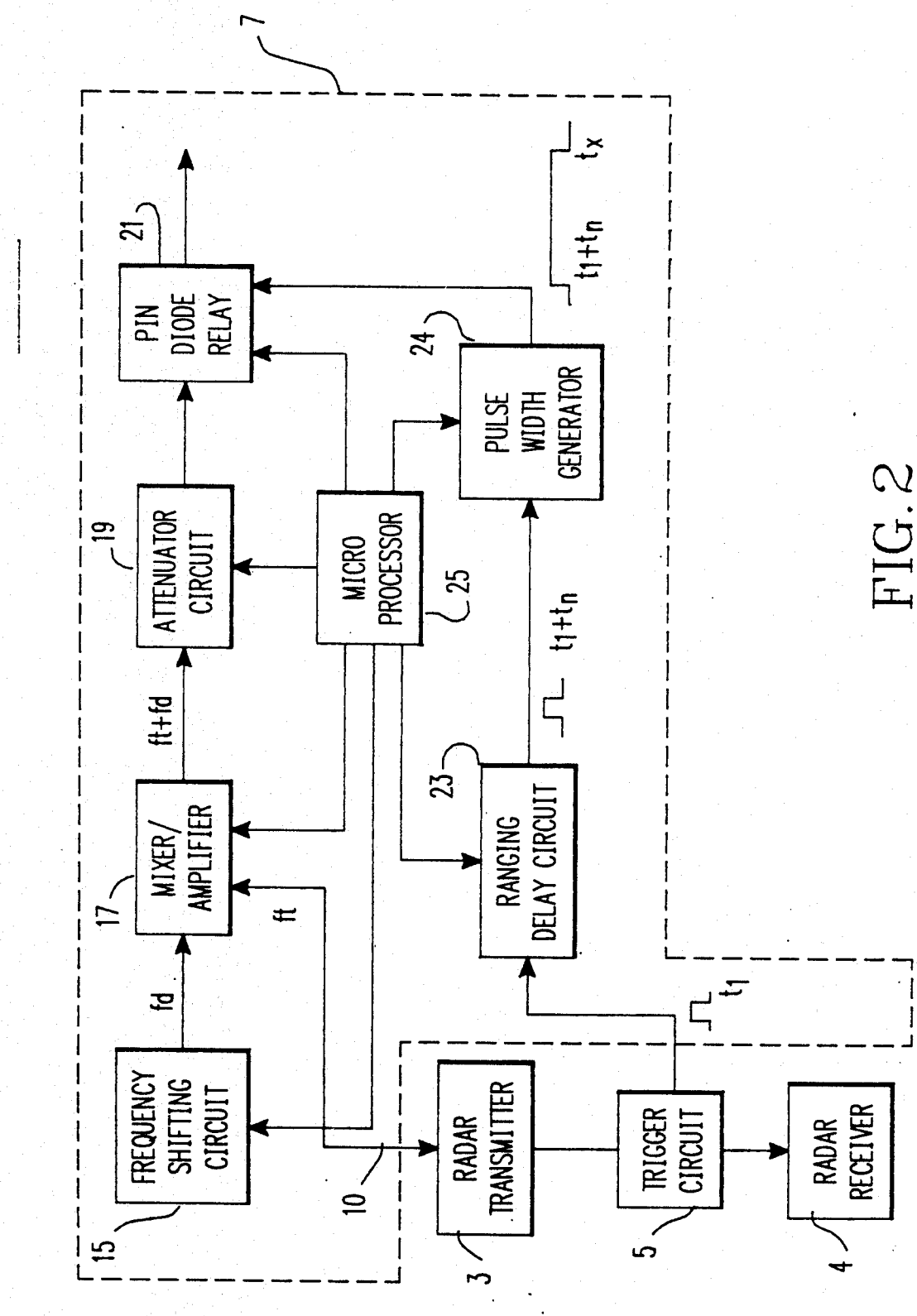
FIG. 2 is a block diagram of the test target generator used in connection with the target simulating system of the invention.

With reference now to FIGS. 1 and 2, wherein like numerals designate like components throughout all the several figures, the instant invention is an improvement over prior art RF horn antenna testing systems 1. Such systems 1 were capable of testing radar systems 2 having a transmitter 3 (which may be continuous wave or pulse), a receiver 4, a trigger circuit 5 for coordinating the operation of the transmitter 3 with the receiver 4, and a common dish antenna 7 for both transmitting and receiving RF pulses. Under normal operating conditions, the radar transmitter 3 would generate a target seeking pulse or envelope of RF radiation having a frequency of between 8 and 12 gigahertz. Just before the pulse was actually transmitted by the antenna 6, the trigger circuit 5 would momentarily snuff the receiver 4 so that the outgoing pulse would not saturate the sensitive receiver 4, which have the effect of temporarily blinding it and possibly even damaging it.

The prior art testing system 1 illustrated in FIG. 1 includes a test target generating circuit 7 that is connected through a coaxial table 8 to an RF horn antenna 9. While the use of the test target generating circuit 7 in this system 1 obviated the need for generating the target seeking pulses from the radar transmitter 3 in order to test the system 2, it was necessary to couple the pulse-forming oscillator circuits of the radar system 2 to the test target generator 7 by way of a coaxial cable 10 so that the target simulating signal generated out of the output of the generating circuit 7 was precisely tuned to the operating frequencies of the radar system 2.

To successfully operate the prior art system 1 it was necessary to space the RF horn antenna 9 at least a distance R from the antenna 6 from the radar system 2, wherein R was equal to or greater than the "far field" of the system 1 (as previously defined in the Background section of this patent application). For X-band radars currently in production, the range R can be in excess of 500 feet. Unfortunately, coaxial cable typically attenuates RF at a rate of approximately 0.25 to 0.75 decibels per foot. Hence at distances of over 500 feet, it is necessary to provide at least 250 decibels of amplification. In theory, such amplification could, of course, be provided by the test target generating circuit 7. However, because of the previously discussed transmission losses associated with coaxial cable, it is desirable that the cable 10 which connects the oscillator circuits of the radar system 2 with the generating circuit 7 be kept as short as possible. The use of a short length of coaxial cable will, of course, necessitate positioning the generating circuit 7 at a position close to the receiver 4 of the radar system 2. With the power level of the generating circuit 7 is raised to a level sufficient to provide the necessary 250 decibels of amplification, the radiative losses that would emanate from the circuit would be powerful enough to pose a noise hazard to the radar receiver 2. Accordingly, such amplification must be accomplished by the provision of a series of booster amplifiers 12a,b,c along the length of cable 8. The necessity of using such booster amplifiers 12a,b,c impairs the mobility of the cable 8, increases the expense of the system 2, and further provides more opportunities for the target simulating signal generated out of the output of the generating circuit 7 to become distorted or otherwise impaired.

With specific reference to FIG. 2, the test target generating circuit 7 generally comprises a frequency shifting circuit 15 for imparting a complex doppler signature $f_d$ onto the target simulating signal, and a mixer/amplifier 17 whose input is connected to the oscillator circuits of the radar system 2. The purpose of the mixer/amplifier is to impose the doppler signature generated by the frequency shifting circuit 15 onto an RF carrier that is in turn generated by amplifying the sample RF frequency $f_t$ received through the coaxial cable 10 that is connected to the oscillator circuits of the radar transmitter 3. In addition to creating a summed signal $f_t + f_d$, the mixer/amplifier conditions the summed signal with a filter circuit which typically passes only that frequency $f_t + f_d$ and suppresses all other harmonics which result from the mixing operation.

While the mixed signal $f_t + f_d$ that leaves the output of the mixer/amplifier 17 basically resembles what the echo of a target-seeking pulse might look like under idealized conditions, further processing is necessary before the mixed, dopplerized signal can resemble a "real world" pulse echo. For this purpose an attenuator circuit 19 is provided. Real world target echos are characterized by what are known in the art as "scintillation" which results from the fact that various portions of potential targets such as helicopters, airplanes, etc. have different radar reflectivity characteristics. The different reflectivities associated with the different parts of the target have the effect of attenuating the amplitudes of some of the various wave forms which form the radar pulse. The purpose of the attenuator circuits 19 is to simulate these scintillation characteristics by electronically attenuating the amplitudes of various wave forms contained within the mixed $f_t + f_d$ wave form in conformance with known, real world expectations. The resulting attenuated, dopplerized signal is then conducted to a pin-diode 21, which, as will be understood in more detail presently, serves as a switch which conducts pulses of the signal out of the output of the test target generating circuit 7.

In order to simulate target range, the test target generating circuit 7 includes a ranging delay circuit 23 whose input is connected to the previously mentioned trigger circuit 5 of the radar system 2 and whose output is connected to a pulse-width generator 24 whose output is in turn connected to the pin-diode relay 21. The purpose of the ranging delay circuit 23 is to delay the transmission of the attenuated and dopplerized target simulating signal through the pin-diode relay 21 in conformance with a desired range simulation. Without the ranging delay circuit 23, the test system 2 would be limited to simulating target signals whose range was fixed by the actual distance R between the radar receiver and antenna 6, and the RF horn antenna 9. The ranging delay circuit 23 is capable of simulating target ranges much greater than the distance R. However, in order to understand how it functions, it is first necessary to understand the purpose of the trigger circuit 5 that is included within the radar system 2.

In addition to snuffing the radar receiver 4 every time the radar transmitter 3 generates a target seeking pulse in order to avoid the saturation of the receiver 4, the trigger circuit 5 further informs the radar receiver 4 of the exact instant when the transmitter 3 emanates such a pulse from its antenna 6. This in turn starts a clock within the radar receiver 4 capable of measuring nanoseconds. When the radar receiver 4 receives an echo from a particular pulse, it computes the total time between the transmission and the receiving pulse and computes the distance of the target by simply multiplying the number of nanoseconds times the speed of light and dividing by 2. The ranging delay circuit 23 operates by sensing the time t1 when the trigger circuit 5 is actuated, and then adding an additional number of nanoseconds (represented by $t_n$) which corresponds to a desired range for the simulated target.

The timing signal $t_1 + t_n$ generated by the ranging delay circuit 23 is received by the pulse-width generator 24, which in turn determines the width of the pulse generated by the test target generating circuit 7 by adding a selected number of nanoseconds $t_x$ onto the pulse transmission time $t_1 + t_n$ generated by the ranging delay circuit 23. The resulting timing signal is in turn applied to the pin-diode relay, which produces an attentuated, dopplerized target simulating pulse which commences at time $t_1+t_n$ and ends at time $t_x$. Stated another way, the ranging delay circuit 23 tells the pin-diode 21 when to start transmitting the pulse, while the pulse width generator 24 determines how long the pulse will last, thus defining the pulse-width of the target simulating signal that leaves the circuit 7.

The versatility of the test target generating circuit 7 can be increased by the provision of a microprocessor 25 whose output is connected to the frequency shifting circuit 15, the mixer/amplifier 17, the attenuator circuit 19, the ranging delay circuit 23, and the pulse-width generator 24. The microprocessor 25 can simulate a variety of different types of targets at different ranges by altering the doppler signature generated by the frequency shifting circuit 15, the degree of amplification in the dopplerized carrier wave generated by the mixer/amplifier 17, and the pattern of attenuation imposed over the dopplerized RF carrier by the attenuator circuit 19, while simulated target range may be changed by changing the value of $t_n$ that the ranging delay circuit 23 adds onto the initializing time $t_1$ detected by the radar receiver 4 upon actuation of the trigger circuit 5. In the prior art, and in the preferred embodiment of the invention, a model no. 2134D89G01 target generating circuit 7 is used.

Figure 3:
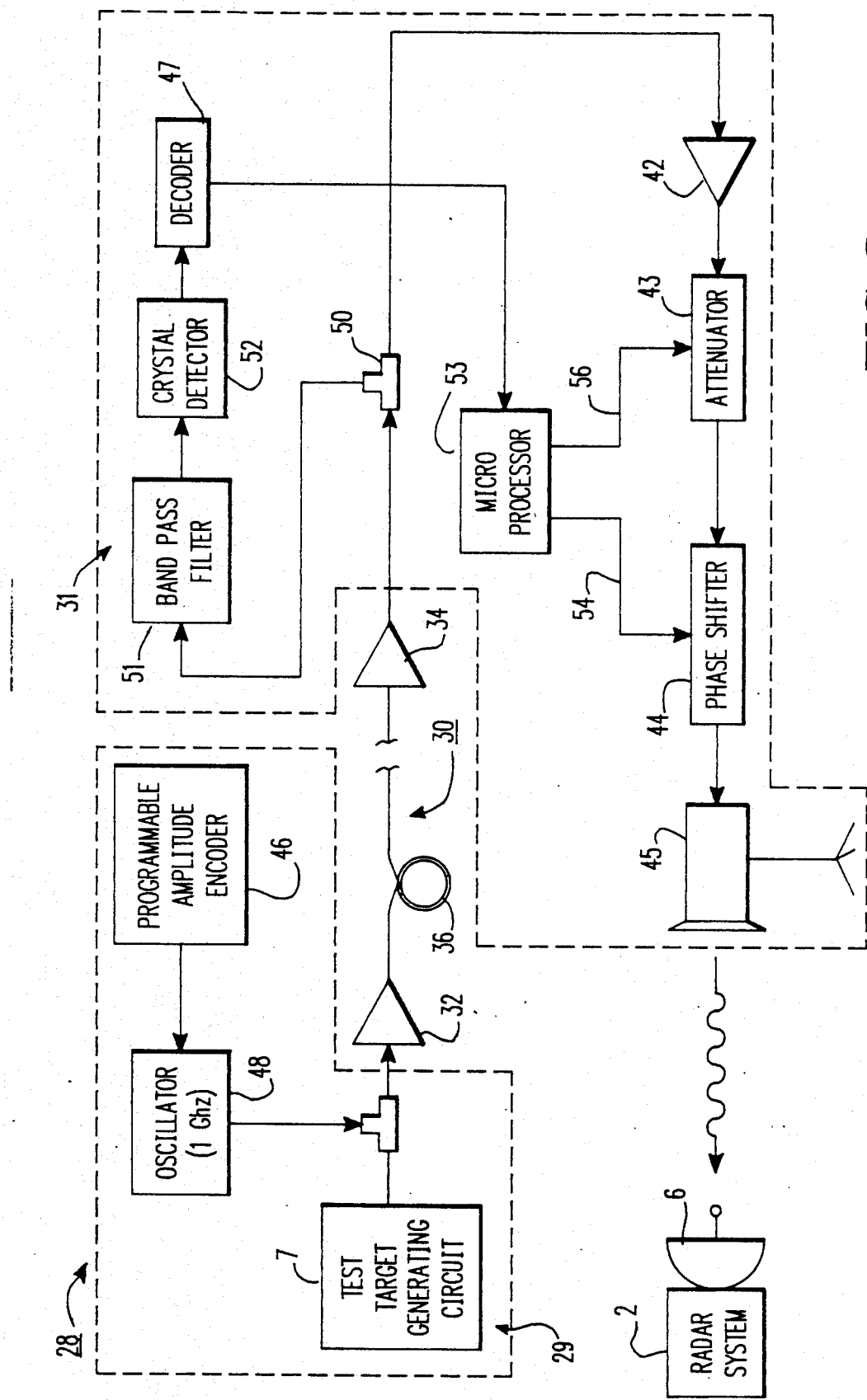
FIG. 3 is a block diagram of the target simulating system of the invention, illustrating how an optical link is used to transmit target simulating signals from the test target generator to an RF horn antenna.

With reference now to FIG. 3, the target simulating system 28 of the invention generally comprises a test target generator 29 that includes the previously described target generating circuit 7 in combination with a pulse encoder 46 and oscillator 48, and an optical link 30 for transmitting the output of generator 29 to an amplification and processing circuit 31. The optical link 30 obviates the need for the shielded, coaxial cable 8 and its booster amplifiers 12a,b,c, and is formed from a laser powered signal transmitter 32 which is coupled to a laser receiver 34 by means of an optical cable 36. In the preferred embodiment, the laser powered signal transmitter 32 is a model no. TSL-1000 transmitter manufactured by Ortel located in Alhambra, Calif., while the laser receiver 34 is a model no. PD-085 receiver made by the same manufacturer as the laser transmitter 32. The transmitter transmits the RF target simulating signal via light energy, while the receiver 34 converts the signal back to RF. While the optical cable 36 used to interconnect the transmitter 32 and receiver 34 may be single mode, a multi-mode cable is preferred for its lower cost. The use of such a multi-mode cable is made possible by the fact that the frequency of the laser generated light which forms the carrier of the target simulating signal is many order of magnitude higher than the 8-12 gigahertz frequency of the target signal. Hence any localized phase shifts induced in the optical carrier signal by bends or twists in the optical cable are typically too small to have any significant impact on the much wider wave lengths that form the target simulating signal. While the laser powered transmitter 32 and receiver 34 typically yield a 40 decibel fixed signal loss during the process of converting the target simulating signal to RF to light energy and back, the transmission losses that occur through the optical cable 36 are practically negligible, amounting to only about 3 decibels per cable mile. Since the use of coaxial cable amounted to over a 250 decibel loss at a distance of only 500 feet, it is easy to see that the instant invention provides at least about four times the transmission efficiency of prior art systems. These losses are also relatively immune to horn antenna to radar separation. For example, from 500 ft.  to 1 mile, only an additional 3 dB loss is incurred. By contrast, the lengthening of a 500 foot coaxial cable to a distance to one mile incurs a loss greater than 1000 dB!

Even though RF target simulating signals generated by the laser receiver 34 have only been diminished about 60 decibels, they still must be amplified before being broadcast back to the radar system 2 if they are to be detected by the radar receiver 4. To this end, the target simulating signal passes through a directional coupler 50, and into a fixed gain amplifier 42 which, in the preferred embodiment, may be a model no. VSX7473HV amplifier manufactured by Varian located in Beverly. Mass. The purpose of the amplifier 42 is to amplify the target simulating signal to a point which more than compensates for the transmission losses caused by the optical link 30. Because the amplified target simulating signal generated by the amplifier 42 would, under most circumstances, saturate the receiver 4 of the radar system 2, it must uniformly attenuated to a level which is detectable by the receiver 4 without saturating it. To this end, the target simulating system 28 of the invention further includes an attenuator 43 serially connected to the output of the fix gain amplifier 42. The combination of the fixed gain amplifier 42 and attenuator 43 allows the system operator to simulate an entire spectrum of signal strengths through the entire range of sensitivity of the radar receiver 4. In the preferred embodiment, the attenuator 43 is a model 3200-1 programmable attenuator manufactured by Weinschel. Of course, a variable gain amplifier could be used in lieu of the combination of a fixed gain amplifier 42 and an attenuator 43. However, the use of these two components is preferred over the use of a variable gain amplifier for cost reasons.

The attenuated, amplified target generating signal which is generated by the attenuator 43 may further be processed through a phase shifter 44 if desired. The provision of such a phase shifter 44 provides the system operator with the optional of selectively shifting the phase of the target simulating signal in order to enhance the "real world" characteristics of the signal, as the echos from actual targets do exhibit phase shifting under certain conditions. Additionally, the phase shifter 44 may be used to compensate for any distortive phase shifting which might inadvertently occur through the optical link 30, or the combination of the fixed gain amplifier 42 and attenuator 43. The output of the phase shifter 44 is conducted directly into the target horn antenna 45, which, in the preferred embodiment is a model 601A horn antenna manufactured by Narda located in Hauppauge, N.Y.

Control of the amount of amplification imparted to the target simulating signal leaving the laser receiver 34 is accomplished by the combination of a programmable amplitude or pulse encoder 46 whose output ultimately is connected to the input of the laser transmitter 32, and a decoder 47 whose input is ultimately connected to the output of the laser 34.

The programmable amplitude or pulse encoder 46 generates a series of pulses indicative of the amount of gain that should be applied to the target simulating signal after it is transmitted through the optical link 30, as well as information regarding the angle of any desired phase shifts which should be imposed on the transmitted signal. The output of the programmable amplitude encoder 46 is serially connected to an oscillator 48 that provides a carrier for the encoded information. Preferably, both the programmable amplitude encoder 46 and oscillator 48 are part of the test target generator 29. While the oscillator 48 may operate at virtually any frequency except the frequency of the target simulating signal, an operational frequency of one gigahertz is preferred. As is schematically indicated in FIG. 3, the resulting, pulse-modulated signal generated by the oscillator 48 is connected to one of the two inputs of a directional coupler 49, which in turn transmits this modulated control signal into the laser powered signal transmitter 32.

At the other side of the optical link 30, another directional coupler 50 diverts a portion of the RF signal generated by the laser receiver 34 into the input of the band-pass filter 51. The band-pass filter 51 is tuned to the frequency of the oscillator 48 that generates the carrier for the encoding information generated by the programmable amplitude encoder 46, and therefore blocks all of the target simulating signal and conducts only the encoder information into a crystal detector 52. The crystal detector 52 in turn strips the encoded signal from its carrier. In the preferred embodiment, the crystal detector 52 is a model no. 4506 crystal manufactured by Narda located in Hauppauge, N.Y. Finally, the carrier-stripped encoder information is transmitted to the decoder 47 which translates this information into a form that is readable by a microprocessor 53. The microprocessor 53 in turn converts this translated decoded information into a specific attenuator setting (and perhaps a particular phase shift angle) and implements these settings through control cables 56 and 54 connected to the attenuator 43 and phase shift circuit 44 respectively.

While the use of a microprocessor 53 is preferred due to the flexibility that such a component lends to the overall target simulating system 28, standard digital control circuitry that is capable of translating the decoded information received from the decoder 47 into attenuator settings and phase shift angles may be used in lieu of a microprocessor 53 if desired.

I claim:

1. A system for simulating targets for a radar system having both a radar transmitter including oscillator circuits for both generating radar pulses and a receiver for receiving the reflections of said pulses comprising:
    a test target generator means having an input slaved to the output of the oscillator circuits of the radar transmitter for generating a target simulating signal;
    an antenna means for emitting the target simulating signal back to the radar receiver, said antenna means being located at least $2D^2/L$ from the radar receiver, where D is the diameter of the radar receiver and L is the wavelength of the target simulating signal and
    an optical transmission link for transmitting the target simulating signal from the test target generator means to the antenna means including first and second transducers for converting the carrier of the target generating signal from a radio frequency carrier to an optical frequency and back again to a radio frequency carrier, and a fiber optic cable means for transmitting the optical carrier from said first transducer to said second transducer in an efficient and secure manner.

2. A system for simulating targets as defined in claim 1, further comprising an amplifier means connected between the output of the second transducer of the optical link and the input of the antenna means for increasing the amplitude of the target simulating signal to a level that is detectable by the radar receiver without saturating said receiver.

3. A system for simulating targets as defined in claim 2, wherein said amplifier means includes a constant gain amplifier for increasing the magnitude of the target simulating signal to a level which is normally above the saturation level of the receiver, and an attenuator for reducing the output signal of the amplifier to a level below saturation.

4. A system for simulating targets as defined in claim 2, wherein the test target generator means further generates control signals indicative of a desired amplitude of the target simulating signal entering the antenna means, and further comprising a control means having an input connected to the output of the second transducer for receiving said control signals and output connected to said amplifier system for controlling the magnitude of the amplification that said amplifier means imparts to the target simulating signal in accordance with said control signals.

5. A system for simulating targets as defined in claim 4, further comprising a band pass filter means connected between the output of the second transducer and the input of the control means for filtering out said control signals from the signals generated by said test target generator means.

6. A system for simulating targets as defined in claim 5, further comprising a carrier stripper circuit connected between the output of the band pass filter means and the input of the control means for stripping the carrier wave from said control signals.

7. A system for simulating targets as defined in claim 6, further comprising a decoder circuit means connected between the output of said carrier stripper circuit and the input of said control means for translating said control signals into a form compatible for processing by said control means.

8. A system for simulating targets as defined in claim 4, wherein the test target generator means further generates control signals indicative of a desired phase characteristic of the target simulating signal entering the antenna means, and further comprising a phase shifting circuit connected between the output of the amplifier means and the input of the antenna means for selectively changing the phase characteristics of the target simulating signal.

9. A system for simulating targets for a radar system having both a radar transmitter including oscillator circuits for both generating radar pulses and a radar receiver, comprising:
    a test target generator means having an input slaved to the output of the oscillator circuits of the radar transmitter for generating a target simulating signal;
    an antenna means for emitting the target simulating signal back to the radar receiver, wherein said antenna means is located at least $2D^2/L$ from the radar receiver, where D is the diameter of the radar receiver and L is the wavelength of the target simulating signal;
    an optical transmission link including a fiber optic cable means for transmitting the target simulating signal from the test target generator means to the antenna means with a minimum amount of signal power loss, and
    an amplifier means connected between the output of the optical transmission link and the input of the antenna means for increasing the amplitude of the target simulating signal to a level that is detectable by the radar receiver without saturating said receiver.

10. A system for simulating targets as defined in claim 9, wherein said test target generator means also generates control signals indicative of a desired amplitude of the target simulating signal entering the antenna means, and further comprising a digital control means having an input connected to the output of the optical link for receiving said control signals, and an output connected to the amplifier means for controller said amplifier means.

11. A system for simulating targets as defined in claim 10, further comprising a band pass filter means connected between the output of the optical link and the input of the digital control means for filtering out said control signals from the signals generated by said test target generator means.

12. A system for simulating targets as defined in claim 11, further comprising a carrier stripper circuit connected between the output of the band pass filter means and the input of the control means for stripping the carrier wave from said control signals.

13. A system for simulating targets as defined in claim 12, further comprising a decoder circuit means connected between the output of said carrier stripper circuit and the input of said control means for translating said control signals into a form compatible for processing by said control means.

14. A system for simulating targets as defined in claim 12, wherein said carrier stripper circuit includes a crystal detector.

15. A system for simulating targets as defined in claim 10, wherein said digital control means includes a microprocessor.

16. A system for simulating targets as defined in claim 9, wherein said amplifier means includes a constant gain amplifier for increasing the magnitude of the target simulating signal to a level which is normally above the saturation level of the receiver, and an attenuator for reducing the output signal of the amplifier to a level below saturation.

17. A system for simulating targets for a radar system having both a radar transmitter having oscillator circuits for generating radar pulses and a receiver for receiving the reflections of said pulses, comprising:

a test target generator means having an input slaved to the output of the oscillator circuits of the radar transmitter for generating a target simulating signal;

an antenna means for emitting the target simulating signal back to the radar receiver wherein said antenna means is located at least $2D^2/l$ from the radar receiver, where D is the diameter of the radar receiver and L is the wavelength of the target simulating signal;

an optical transmission link for transmitting the target simulating signal from the test target generator means to the antenna means through an optical carrier, including a fiber optical cable means for conducting said optical carrier in a secure manner with a minimum of power loss;

an amplifier means connected between the output of the optical transmission link and the input of the antenna means for increasing the amplitude of the target simulating signal transmitted out of the link to a level that is detectable by the radar receiver without saturating said receiver, and control means connected to the amplifier means for controlling the amount of amplification that the amplifier circuit applies to the target simulating signal.

18. A system for simulating targets as defined in claim 17, wherein said amplifier means includes a constant gain amplifier for increasing the magnitude of the target simulating signal to a level which is normally below the saturation level of the receiver, and an attenuator for reducing the output signal of the amplifier to a level below saturation.

19. A system for simulating targets as defined in claim 17, wherein the test target generator means further generates control signals indicative of a desired amplitude of the target simulating signal emitted from said antenna means, and wherein said control means is connected to the output of the test target generator means through said optical transmission link.

20. A system for simulating targets as defined in claim 17, wherein the test target generator means further generates control signals indicative of a desired phase characteristic of the target simulating signal entering the antenna means, and further comprising a phase shifting circuit connected between the output of the amplifier means and the input of the antenna means for selectively changing the plan characteristics of the target simulating signal.

21. A system for simulating targets as defined in claim 17, wherein said optical transmission link includes a laser means for generating the optical carrier.

22. A method of providing a target simulating signal to a radar system having a radar transmitter that includes oscillator circuits for generating radar pulses of a wavelength L, and a receiver having a diameter D for receiving reflections from said pulses, comprising the steps of generating a radio frequency target simulating signal from a test target generator means having an input that is slaved to the oscillator circuits of the radar transmitter;

remotely transmitting the target simulating signal from the radar receiver to a broadcast antenna located a distance of at least $2D^2/L$ from said receiver through an optical carrier conducted through a fiber optic cable means;

converting the carrier of the target simulating signal from an optical carrier back to radio frequency;

amplifying the target simulating signal to a level which is detectable by the radar receiver without saturating it, and broadcasting the amplified target simulating signal through the broadcast antenna back to the radar receiver.

23. A method of providing a target simulating signal as defined in claim 22, further including the step of selectively shifting the phase of the target simulating signal before broadcasting it to the radar receiver to correct for phase shifts caused by impedances in the remote transmission of the target simulating signal.

24. A method of providing a target simulating signal as defined in claim 22, wherein said amplification step is performed by first amplifying the target simulating signal to a level which would saturate the radar receiver, and then attenuating the amplified signal to a level which is detectable by the radar receiver without saturating it.

* * * * *